United States Patent
Hwang et al.

(10) Patent No.: US 7,380,970 B2
(45) Date of Patent: Jun. 3, 2008

(54) PRISM SHEET EMPLOYED IN A BACKLIGHT UNIT

(75) Inventors: Kab Jin Hwang, Chungcheongbuk-do (KR); Seoung Ho Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 11/439,249

(22) Filed: May 24, 2006

(65) Prior Publication Data

US 2007/0086209 A1   Apr. 19, 2007

(30) Foreign Application Priority Data

Oct. 19, 2005   (KR)   ................ 10-2005-0098750

(51) Int. Cl.
*F21V 7/04* (2006.01)
*G02F 1/1335* (2006.01)

(52) U.S. Cl. .................... 362/620; 362/628; 349/64

(58) Field of Classification Search ................ 362/341, 362/620, 330, 331, 628; 349/61, 65, 96, 349/64

See application file for complete search history.

(56) References Cited

U.S. PATENT DOCUMENTS 6,559,911 B2 *   5/2003   Arakawa et al. .............. 349/96

FOREIGN PATENT DOCUMENTS

KR   10-2004-0079028 A   9/2004

* cited by examiner

*Primary Examiner*—John A Ward
(74) *Attorney, Agent, or Firm*—Birch, Stewart, Kolasch & Birch, LLP

(57) ABSTRACT

The present invention relates to a prism sheet employed in a backlight unit. The prism sheet according to one embodiment of the present invention comprises a coating layer having a resin transmitting the incident light from the outside; and a plurality of beads contained in the resin and scattering the incident light; a base film disposed on the coating layer and transmitting the light; and a plurality of prisms disposed on the base film, and refracting and condensing the light transmitted from the base film. The prism sheet of the present invention may not be deformed even if the temperature of the backlight unit is increased.

17 Claims, 4 Drawing Sheets

PRISM SHEET EMPLOYED IN A BACKLIGHT UNIT

BACKGROUND OF THE INVENTION

1. Field of the Invention

The present invention relates to a prism sheet employed in a backlight unit, particularly a prism sheet having no structural deformation.

2. Description of the Related Art

A liquid crystal display (hereinafter, referred to as "LCD") device is an electronic device changing and conveying various electric information generated from various apparatuses to visual information by using change of transmissivity of liquid crystals.

The LCD device is a device displaying information, but has no self-light emitting source. Thus, the LCD device needs a separate device in the backside in order to brighten the whole screen of the LCD device uniformly. The device providing a light is a backlight unit (hereinafter, referred to as "BLU").

According to the installation method of cold cathode fluorescent lamp (hereinafter, referred to as "CCFL"), the BLU may be made in two methods: a direct-light method in which a lamp is located under an LCD panel, and an edge-light method in which a lamp is disposed on the side of a light guiding plate.

FIG. 1 is a cross-cross-sectional view illustrating a conventional BLU of a LCD device, and FIG. 2 is a cross-cross-sectional view illustrating the constitution of a prism sheet in FIG. 1.

In FIG. 1, the BLU is driven by the edge-light method, and includes a light source unit 110, a light guiding plate 120, a reflective sheet 130, and an optical film 140.

The light source unit 110 includes at least one CCFL 112 and a light source reflector 114.

The CCFL 112 generates a light having a predetermined wavelength.

The light source reflector 114 reflects the light generated from the CCFL 112 to the light guiding plate 120, and then the amount of incident light to the light guiding plate 120 is increased.

The light generated from the CCFL 112 is reflected by the light source reflector 114 and the reflective sheet 130. Then, the reflecting light is diffused uniformly through the light guiding plate 120.

The optical film 140 includes a diffuser 142, a prism sheet 144 and a protection sheet 146.

The light which is diffused uniformly in the light guiding plate 120 passes through the diffuser 142. The diffuser 142 makes the brightness uniformly, and widens the viewing angle of the LCD.

The brightness of light passed through the diffuser 142 is decreased rapidly. To prevent it, a prism sheet 144 is used.

In FIG. 2, the prism sheet 144 includes a base film 150, a prism base 152, and a plurality of prisms 154. Here, the prism base 152 and the prisms 154 are formed in sequence on the base film 150. The prism sheet 144 refracts the light that is transmitted from the diffuser 142, is incident to the base film 150, and passes through the prisms 154. Then, the incident light with low angle is condensed in the direction of the protection sheet 146, and the brightness is increased within effective viewing angle of the LCD.

The protection sheet 146 is disposed on the prism sheet 144, and prevents the prism sheet 144 from scratch, and widens the viewing angle of the LCD which is narrowed by the prism sheet 144.

In case BLU 100 continues to be used, the temperature of BLU 100 is increased by heat generated from CCFL 112.

Accordingly, the prism sheet 144 was deformed or rumpled by heat, and the function of the prism sheet 144 is deteriorated.

Also, the prism sheet 144 may be scratched by a slight impact.

SUMMARY OF THE INVENTION

An object of the present invention is to provide a prism sheet on which a heat resistant coating layer is formed, and thus the prism sheet may not be deformed even if the temperature of the backlight unit is increased.

Another object of the present invention is to provide a prism sheet that has a coating layer which is made up of a resin and a plurality of beads, and so is scratch-resistant enough to be used for a backlight unit.

The prism sheet according to one embodiment of the present invention comprises a coating layer having a resin transmitting the incident light from the outside; and a plurality of beads contained in the resin and scattering the incident light; a base film disposed on the coating layer and transmitting the light; and a plurality of prisms disposed on the base film, and refracting and condensing the light transmitted from the base film.

BRIEF DESCRIPTION OF THE DRAWINGS

These and other features, aspects and advantages of the present invention will be better understood with regard to the following description, appended claims, and accompanying drawings wherein:

DETAILED DESCRIPTION OF THE INVENTION

Hereinafter, the prism sheet employed in the backlight unit according to preferred embodiments of the present invention will be described in detail with attached drawings.

Figure 1:
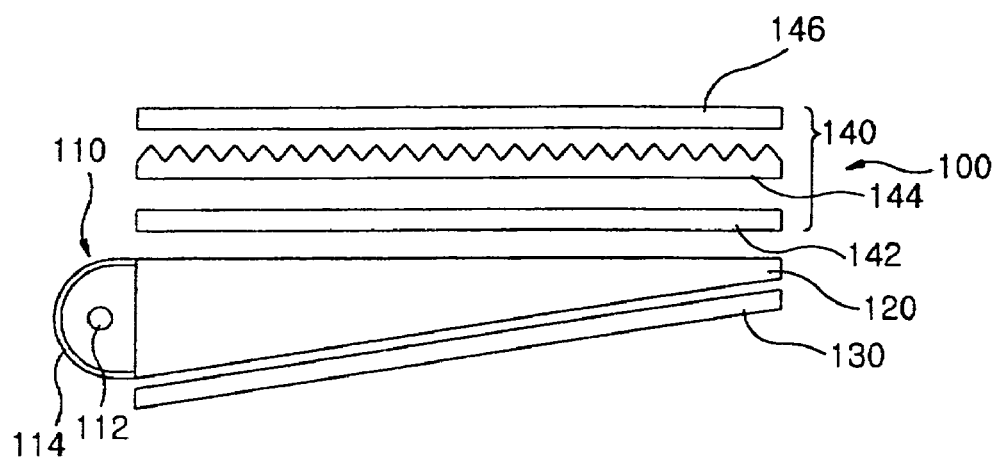
FIG. 1 is a cross-sectional view illustrating a conventional backlight unit of a liquid crystal display device.
Figure 2:
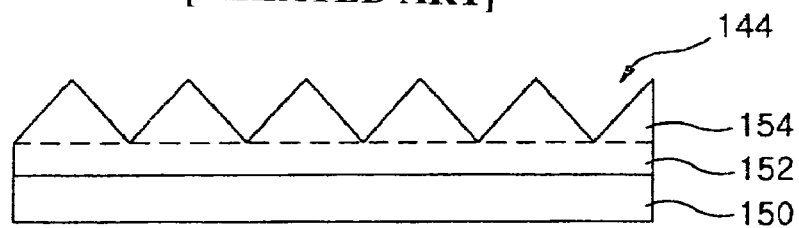
FIG. 2 is a cross-sectional view illustrating the constitution of a prism sheet in FIG. 1.
Figure 3:
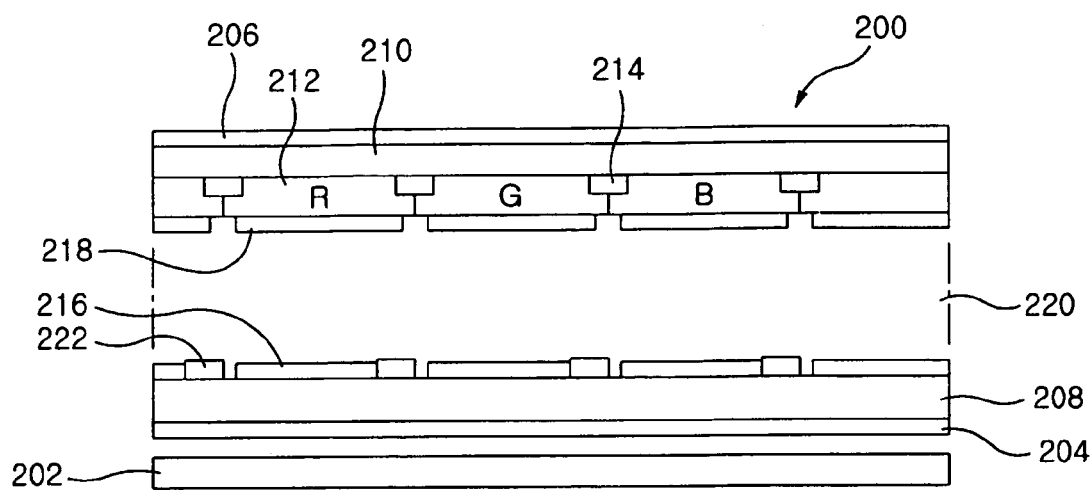
FIG. 3 is a cross-sectional view illustrating a liquid crystal display device using the backlight unit according to one embodiment of the present invention.
Figure 4:
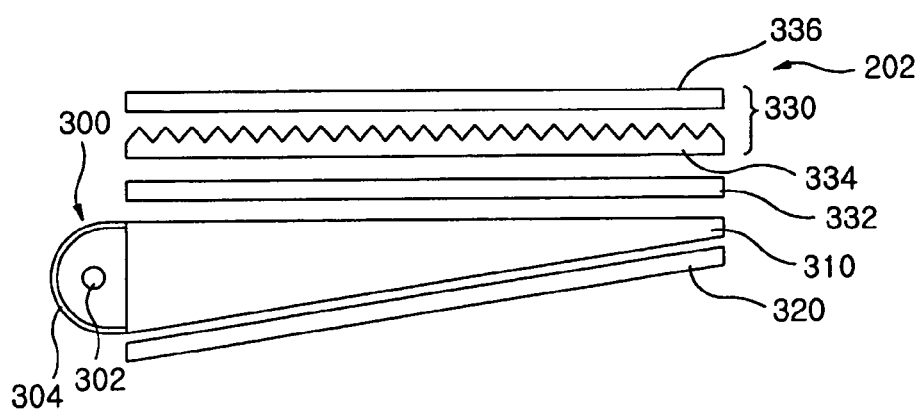
FIG. 4 is a cross-sectional view illustrating the backlight unit according to one embodiment of the present invention.

FIG. 3 is a cross-sectional view illustrating a liquid crystal display device which uses the backlight unit according to one embodiment of the present invention. FIG. 4 is a cross-sectional view illustrating the backlight unit according to one embodiment of the present invention.

In FIG. 3, a liquid crystal display device (LCD) comprises a LCD panel 200 and a backlight unit 202.

The LCD panel 200 comprises a lower polarization film 204, an upper polarization film 206, a lower glass substrate 208, an upper glass substrate 210, a color filter 212, black matrix 214, a pixel electrode 216, a common electrode 218, a liquid crystal layer 220 and a TFT array 222.

The color filter 212 includes color filters corresponding to red, green and blue, and when a light is entered, the color filter 212 generates images corresponding to red, green and blue.

The TFT array 222 is a switching device, and switches the pixel electrode 216.

Liquid crystals included in the liquid crystal layer 220 are arrayed in accordance of voltage provided to the common electrode 218 and the pixel electrode 216.

As a result, a light generated from the BLU 202 is entered the color filter 212 in correspondence to the liquid crystals array of the liquid crystal layer 220.

The BLU 202 is disposed under the LCD panel 200, and provides a light, for example, a white light, to the LCD panel 200.

In FIG. 4, the BLU 202 comprises a light source unit 300, a reflection sheet 320 and an optical film 330.

The light source unit 300 is disposed on the side of the BLU 202, and comprises at least one light source 302 and a light source reflector 304.

As the light source 302, a cold cathode fluorescent lamp (CCFL), a light emitting diode (LED), or an external electrode fluorescent lamp (EEFL), all of which can emit a light having a certain wavelength, may be used.

CCFL has been widely used in the prior backlight unit, and provides a very bright white light.

LED is a semiconductor device that emits non-intervening narrow-spectrum light when electrically biased in the forward direction, and has better color-reproducibility and contrast than CCFL.

EEFL has a brightness of above 400 nit which is 60% higher than CCFL, and thus the application areas of TFT LCD can be broadened to such area as TV requiring a high brightness. Also, the electrodes of EEFL are placed outside, differently from CCFL having the electrodes within a lamp. Thus, EEFL may be operated in parallel, and so uniform brightness on LCD can be obtained by reducing voltage variation between lamps.

The light source reflector 304 covers the light source 302, and enhances the light efficiency by inducing a light emitted from the light source 302 to enter the side of the light guiding plate 310. Thus, the light source reflector 304 is made up of a highly reflective material, and may have silver (Ag) coating on the surface.

The reflection sheet 320 is disposed under the light guiding plate 310, and reflects a light emitted from the light source 302 in the direction of the light guiding plate 310. In order to increase the reflection rate, the reflection sheet 320 is manufactured by coating silver (Ag) on a basic substance made up of aluminum (Al), etc. Here, the process of manufacturing the reflection sheet 320 may further include titanium coating to prevent deformation when heat is provided.

The light guiding plate 310 is designed so that continuous total reflection of a light incident from the light source unit 300 is possible over a critical angle. The light source 302 is disposed on the side of the BLU 202, and thus the light emitted from the light source 302 is not transmitted to the whole surface of the BLU 202 uniformly, but condensed on the edge. Accordingly, the light guiding plate 310 is needed to transmit a light to the whole surface uniformly. Generally, the light guiding plate 310 is made up of a transparent acrylic resin, for example, poly methyl meta acrylate (PMMA). The PMMA has high toughness, and thus is not broken easily, is light and less deformed, and has high transmittance of visible rays.

Also, the light guiding plate 310 induces a light to proceed to the direction of the LCD panel 200.

The optical film 330 comprises a diffuser 332, a prism sheet 334 and a protection sheet 336.

The light diffused uniformly in the light guiding plate 310 passes through the diffuser 332. The diffuser 332 diffuses or condenses a light transmitted from the light guiding plate 310 to make the brightness uniform, and widens the viewing angle of the LCD.

The brightness of the light transmitted from the diffuser 332 is decreased abruptly. To prevent it, the prism sheet 334 is used.

The prism sheet 334 condenses a light transmitted from the diffuser 332 in a direction of the panel 200 so that the brightness of the light transmitted from the BLU 202 to the panel 200 is enhanced.

Optionally, the protection sheet 336 is disposed on the prism sheet 334, prevents the prism sheet 334 from scratch, and widens the viewing angle of the LCD which is narrowed by the prism sheet 334.

Hereinafter, the constitution of the prism sheet 334 is described.

Figure 5:
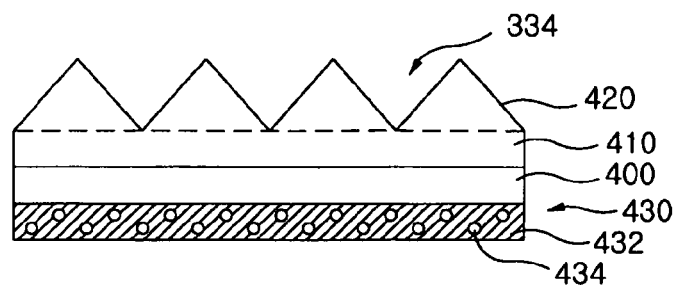
FIG. 5 is a cross-sectional view illustrating the constitution of the prism sheet in FIG. 4

FIG. 5 is a cross-sectional view illustrating the constitution of the prism sheet in FIG. 4.

In FIG. 5, the prism sheet 334 according to one embodiment of the present invention comprises a base film 400, a prism base 410, a plurality of prisms 420, and a coating layer 430.

The prism base 410 connects the base film 400 to the prisms 420, and enhances heat resistant and bending characteristics of the prism sheet 334.

The prism base 410 is disposed in the prism sheet 334, and thus the prisms 420 can be formed easily.

The coating layer 430 which is disposed under the base film 400 enhances the heat resistant characteristic, and diffuses a light emitted from the light guiding plate 310.

Particularly, the coating layer 430 is made up of a resin 432 and a plurality of beads 434.

The resin 432 may be an acrylic resin which can prevent scratches and has good heat resistance, and the acrylic resin is a kind of polyacrylate or polymethacrylate.

The beads are contained by about 25 wt % to 35 wt % to the resin, preferably 30 wt %.

In the coating layer 430 according to one embodiment of the present invention, the size and distribution of beads 434 are random. When various sizes of beads are randomly distributed in the resin 432, the haze effect is increased, which is effective for preventing defects like scratches generated on a lower surface of the resin 432 or diffuser 332 disposed under the resin 432 from being projected on the LCD panel 200.

In the coating layer 430 according to another embodiment of the present invention, substantially same size of beads 434 are distributed uniformly in the resin 432. In the case, the haze effect is decreased, but the brightness is enhanced.

The coating layer 430 prevents the prism sheet 334 from being deformed by heat generated from the light source 302, i.e. the prism sheet 334 with a heat resistant is not rumpled. Also, even if the prism sheet 334 is deformed at a high temperature, it has restoration strength good enough to be restored to the original shape at normal temperature.

Also, the coating layer 430 prevents the prism sheet 334 from scratches occurred by outside impact, physical force, etc.

The coating layer has a thickness of about 2 µm to 30 µm. The thickness of the coating layer 430 is designed within the above range depending on thicknesses of the base film 400 and the prism base 410. For example, in case the base film 400 and the prism base 410 have the thickness of about 125 μm, the coating layer 430 has a thickness of about 3 μm to 10 μm. In case the base film 400 and the prism base 410 have the thickness of about 188 μm, the coating layer 430 has a thickness of about 15 μm to 30 μm. In case the base film 400 and the prism base 410 have the thickness of about 250 μm, the coating layer 430 has a thickness of about 3 μm to 10 μm.

The thickness of the coating layer 430 is not always in proportion to the thicknesses of the base film 400 and the prism base 410. In case the base film 400 and the prism base 410 are thick, it is fine to design that the thickness of the coating layer 430 is thin, due to its heat resistant characteristic.

Hereinafter, the experimental results to scratch characteristic of the conventional prism sheet 144 and the prism sheet 334 according to the present invention will be described.

Figure 6A:
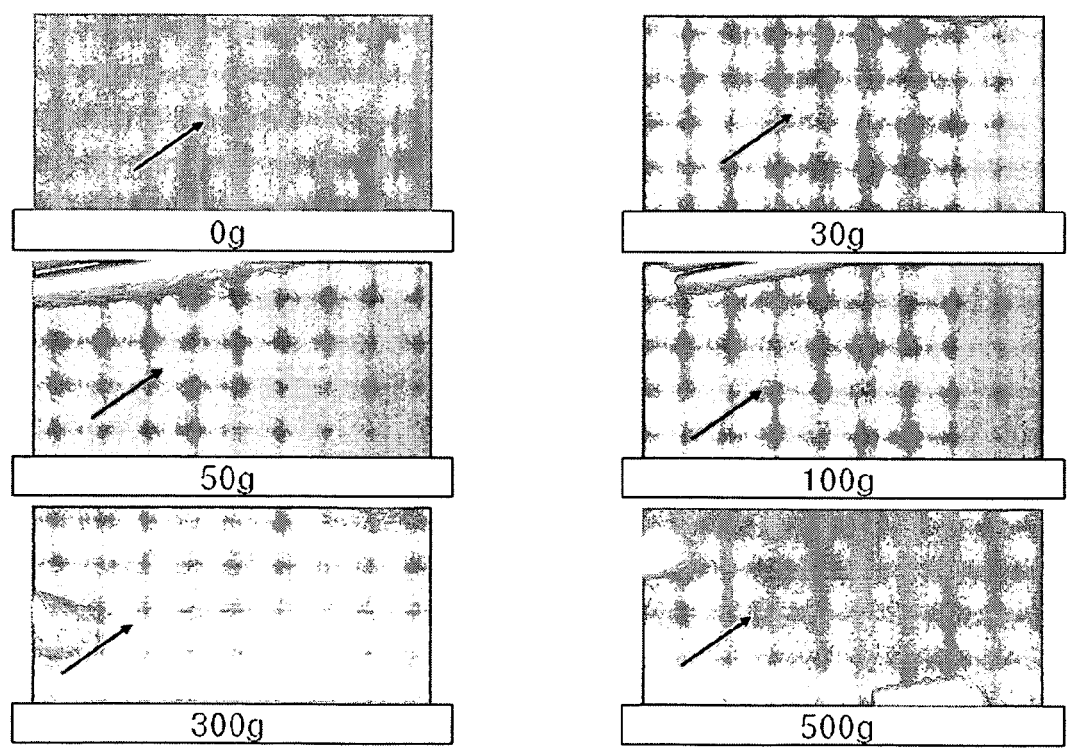
FIG. 6a and FIG. 6b illustrate experimental results to scratch characteristic of a conventional prism sheet and the prism sheet according to one embodiment of the present invention.
Figure 6B:
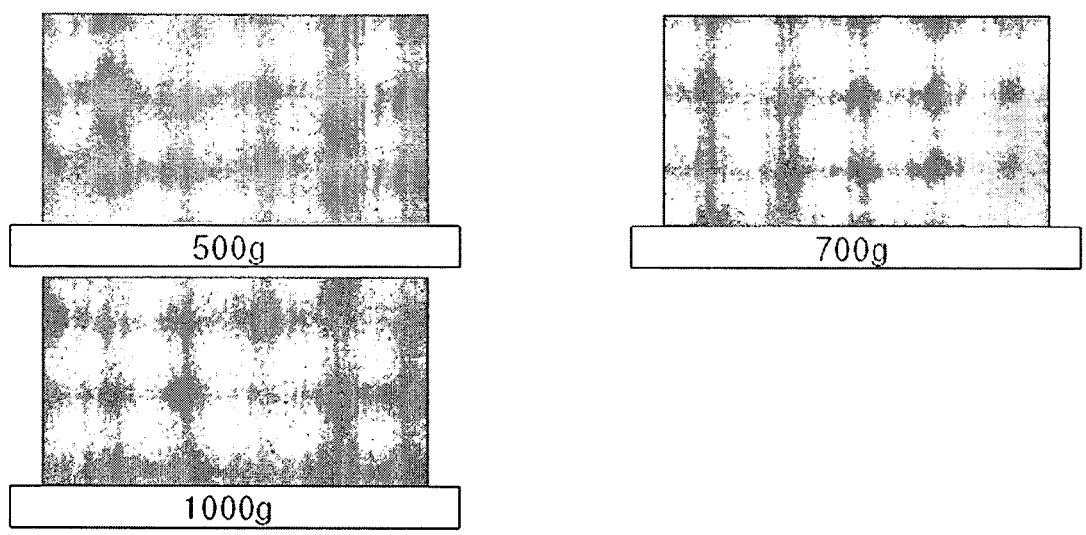

FIG. 6a and FIG. 6b are plane views illustrating the experimental results to scratch of the prior prism sheet 144 and the prism sheet 334 according to the present invention.

The experiment measured scratches according to weight in order to test the scratch characteristic of the prior prism sheet 144 and the prism sheet 334 according to the present invention.

A test device having a certain weight scratched surfaces of the prism sheets 144 and 334. The test device repeated moving as much as 15 mm on the surfaces of the prism sheets 144 and 334 for 2000 times, and the scratches of each surface of the prism sheets 144 and 334 were observed.

In FIG. 6a, in case the weight is over 0 g, scratches are observed in the prior prism sheet 144.

However, in FIG. 6b, scratches are not observed in the prism sheet 334 even if the weight is 1000 g.

Accordingly, it is confirmed that the scratch characteristic of the prism sheet 334 of the present invention is better than that of the prior prism sheet.

Hereinafter, the light emitting operation of the LCD device is described.

Again, in FIG. 3, the BLU 202 provides a plane light, white light, to the LCD panel 200.

Subsequently, the TFT array 222 switches the pixel electrode 216.

And, a certain voltage difference is applied between the pixel electrode 216 and the common electrode 218. As a result, liquid crystals of the liquid crystal layer 220 are arrayed in correspondence to each of the red, green and blue color filters.

In this case, the amount of the plane light provided from the BLU 202 is controlled when it passes through the liquid crystal layer 220, and such controlled plane light is transmitted to the color filter 212.

As a result, the color filter 212 displays images with variable gray level.

Specifically, red color filter, green color filter, and blue color filter forms one pixel, and the pixel displays images by mixing lights transmitted through the red, green and blue color filters.

The preferred embodiments of the invention have been described for illustrative purposes, and those skilled in the art will appreciate that various modifications, additions, and substitutions are possible, without departing from the scope and spirit of the invention as disclosed in the accompanying claims.

What is claimed is:

1. A prism sheet, comprising:
a base film transmitting an incident light;
a plurality of prisms disposed on one side of the base film, and refracting and condensing the light transmitted from the base film; and
a heat resistance coating layer disposed on another side of the base film,
wherein the heat resistance coating layer includes a resin transmitting the incident light from an outside, and a plurality of beads contained in the resin and scattering the incident light.

2. The prism sheet of claim 1, wherein the coating layer has a thickness of about 2 μm to 30 μm.

3. The prism sheet of claim 1, wherein the resin is an acrylic resin.

4. The prism sheet of claim 3, wherein the acrylic resin is a kind of polyacrylate or polymethacrylate.

5. The prism sheet of claim 1, wherein the beads are contained by about 25 wt % to 35 wt % to the resin.

6. A backlight unit, comprising:
a light source; and
a prism sheet including a base film and a plurality of prisms disposed on one side of the base film,
wherein the prism sheet further includes a heat resistance coating layer disposed on another side of the base film, and having a resin transmitting the incident light from the outside, and a plurality of beads contained in the resin and scattering the incident light.

7. The backlight unit of claim 6, wherein the coating layer has a thickness of about 2 μm to 30 μm.

8. The backlight unit of claim 6, wherein the resin is an acrylic resin.

9. The backlight unit of claim 8, wherein the acrylic resin is a kind of polyacrylate or polymethacrylate.

10. The backlight unit of claim 6, wherein the beads are contained by about 25 wt % to 35 wt % to the resin.

11. A liquid crystal display device, comprising:
a liquid crystal panel making a certain image by using a light; and
a backlight unit providing the light to the liquid crystal display panel, the backlight unit including:
a light source; and
a prism sheet including a base film and a plurality of prisms disposed on one side of the base film,
wherein the prism sheet further includes a heat resistance coating layer disposed on another side of the base film, and having a resin transmitting the incident light from the outside, and a plurality of beads contained in the resin and scattering the incident light.

12. The liquid crystal display device of claim 11, wherein the coating layer has a thickness of about 2 μm to 30 μm.

13. The liquid crystal display device of claim 11, wherein the resin is an acrylic resin.

14. The liquid crystal display device of claim 13, wherein the acrylic resin is a kind of polyacrylate or polymethacrylate.

15. The liquid crystal display device of claim 11, wherein the beads are contained by about 25 wt % to 35 wt % to the resin.

16. The backlight unit of claim 6, further comprising a diffuser diffusing the light from the light source.

17. The liquid crystal display device of claim 11, further comprising a diffuser diffusing the light from the light source.

* * * * *